(12) United States Patent
Ciulla et al.

(10) Patent No.: US 11,582,108 B2
(45) Date of Patent: Feb. 14, 2023

(54) METHOD AND SYSTEM FOR AUTOMATIC CREATION OF TRUST COMMUNITIES

(71) Applicant: Xerox Corporation, Norwalk, CT (US)

(72) Inventors: Kim P. Ciulla, Bloomfield, NY (US); Yolanda R. Zhesnik, Webster, NY (US); Timothy L. Dioguardi, Webster, NY (US); PAul Roberts Conlon, South Bristol, NY (US); Kenneth B. Schleede, Lyndonville, NY (US); Dianne Colelli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 174 days.

(21) Appl. No.: 17/198,891

(22) Filed: Mar. 11, 2021

(65) Prior Publication Data
US 2022/0294696 A1    Sep. 15, 2022

(51) Int. Cl.
| | | |
|---|---|---|
| *H04L 12/24* | (2006.01) |
| *H04L 29/06* | (2006.01) |
| *H04L 29/08* | (2006.01) |
| *H04L 29/12* | (2006.01) |
| *H04N 1/32* | (2006.01) |
| *G06F 3/12* | (2006.01) |
| *H04L 41/0893* | (2022.01) |
| *H04L 9/40* | (2022.01) |
| *H04L 67/06* | (2022.01) |
| *H04L 61/4541* | (2022.01) |
| *H04L 67/51* | (2022.01) |

(52) U.S. Cl.
CPC ........ *H04L 41/0893* (2013.01); *G06F 3/1203* (2013.01); *G06F 3/1226* (2013.01); *H04L 61/4541* (2022.05); *H04L 63/20* (2013.01); *H04L 67/06* (2013.01); *H04L 67/51* (2022.05); *H04N 1/32523* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 10,366,086 B1 * | 7/2019 | Conlon | ...................... G06F 7/08 |
| 10,367,957 B1 * | 7/2019 | Schleede | ................ G06F 16/958 |
| 2021/0266415 A1 * | 8/2021 | Kawaguti | .......... H04N 1/00244 |

* cited by examiner

*Primary Examiner* — Andrew H Lam
(74) *Attorney, Agent, or Firm* — Lippes Mathias LLP

(57) ABSTRACT

A method of automatically creating trust communities in a fleet of devices. The method includes finding candidate devices in a fleet of devices via one or more candidate discovery techniques and generating device-related data based on the candidate devices that are found, analyzing the device-related data via an analytics engine and creating one or more fleet orchestrator device lists based on the analysis of the device-related data, and automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

20 Claims, 7 Drawing Sheets

| Number | Device SN | Product Model | SW Version | Voltage | Fax Card | Stapling | Folding | Booklet Maker | Administrator | Country | Building | Units | Location | Department | Shift | Budget Center | CSE | Status |
|---|---|---|---|---|---|---|---|---|---|---|---|---|---|---|---|---|---|---|
| 1 | SN11111111 | AltaLink* B8090 | 100.xxx.xxx.14200 | nnnV | Y | Y | Y | Y | Smith | USA | B123 | Imperial | Hallway | Accounting | 1 | A11111 | C.S. | Down For Service |
| 2 | SN22222222 | AltaLink* B8090 | 100.xxx.xxx.14200 | nnnV | Y | Y | Y | Y | Smith | USA | B123 | Imperial | Main Office | Accounting | 2 | A11111 | C.S. | OK |
| 3 | SN33333333 | AltaLink* C8070 | 100.xxx.xxx.14200 | nnnV | Y | N | N | Y | Doe | USA | B2454 | Imperial | Hallway | Personnel | 2 | B11111 | S.E. | OK |
| 4 | SN44444444 | AltaLink* C8070 | 100.xxx.xxx.14200 | nnnV | N | N | N | Y | Doe | USA | B2454 | Imperial | Main Office | Personnel | 2 | B11111 | S.E. | OK |
| 5 | SN55555555 | AltaLink* C8070 | 100.xxx.xxx.14200 | nnnV | N | Y | Y | Y | Doe | USA | B2454 | Imperial | Hallway | Personnel | 2 | B11111 | S.E. | OK |
| 6 | SN66666666 | AltaLink* C8170 | 105.xxx.xxx.15000 | nnnV | Y | N | Y | Y | Doe | USA | B2454 | Imperial | Hallway | Personnel | 2 | B11111 | S.E. | New |
| 7 | SN77777777 | AltaLink* C8170 | 105.xxx.xxx.15000 | nnnV | N | N | Y | Y | Doe | USA | B2454 | Imperial | Hallway | Personnel | 2 | B11111 | S.E. | New |
| 8 | SN88888888 | AltaLink* B8145 | 105.xxx.xxx.15000 | nnnV | Y | N | Y | Y | Smith | USA | B123 | Imperial | Hallway | Accounting | 2 | A11111 | C.S. | New |
| 9 | SN99999999 | AltaLink* B8145 | 105.xxx.xxx.15000 | nnnV | N | N | Y | Y | Smith | UK | C25 | Metric | Hallway | Accounting | 2 | A11111 | C.S. | New |
| 10 | SN00000000 | AltaLink* B8145 | 105.xxx.xxx.15000 | nnnV | N | N | Y | Y | Smith | USA | B123 | Imperial | Hallway | Accounting | 2 | A11111 | C.S. | New |

FIG. 6

METHOD AND SYSTEM FOR AUTOMATIC CREATION OF TRUST COMMUNITIES

BACKGROUND

The exemplary embodiment relates to a system and method for managing data-receiving devices and finds particular application in connection with a method and system for automatic creation of trust communities to facilitate management of a fleet of devices.

Computer-operated image forming devices, such as multi-function printers and the like, often require software updates and other files, like configuration files, to manage security or other settings. Managing a fleet of such devices is common today. However, managing such a fleet generally requires a separate server, which is both costly and complex to set up and maintain. While well-suited for larger corporations, this approach is generally not viable for many businesses.

Thus, while larger organizations, with large numbers of devices, may have a substantial and highly trained support staff to handle updates to a fleet of devices and large, expensive dedicated external servers, such resources may be impractical for smaller organizations. It would be helpful for both small and larger organizations to be able to efficiently manage the distribution of files across a fleet of devices with built-in functionality.

Multi-function printers may be grouped in a trust community to share files. A trust community is a group of devices that are securely connected with each other. These trusted devices are connected through administrative credentials and may share a trust token that allows them to remain connected with each other. A tree topology is an example of one structure that can be used within a trust community to arrange the trusted devices to share files. One of the objectives of sharing files is to keep a standard set of settings across a fleet of devices.

However, a major challenge with this approach is that it is time consuming to manually create a trust community and a distribution topology. Thus, there remains a need for a system and method for automatically creating trust communities and setting up file distribution in a way that facilitates efficient data distribution and fleet management.

INCORPORATION BY REFERENCE

The following references, the disclosures of which are incorporated herein by reference, are mentioned:
U.S. Pat. No. 10,367,957, issued Jul. 30, 2019, entitled HIGHLY-SCALABLE NATIVE FLEET MANAGEMENT, by Schleede, et al.; and
U.S. Pat. No. 10,366,086, issued Jul. 30, 2019, entitled SORTING OF DEVICES FOR FILE DISTRIBUTION, by Conlon, et al.

BRIEF DESCRIPTION

In accordance with an aspect of the exemplary embodiment, a method of automatically creating trust communities in a fleet of devices. The method includes finding candidate devices in a fleet of devices via one or more candidate discovery techniques and generating device-related data based on the candidate devices that are found, analyzing the device-related data via an analytics engine and creating one or more fleet orchestrator device lists based on the analysis of the device-related data, and automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

In accordance with another aspect of the exemplary embodiment, a system for automatically creating trust communities in a fleet of devices is provided. The system includes at least one processor and at least one memory including computer program code, the at least one memory and the computer program code configured to, with the at least one processor, cause the system at least to perform: finding candidate devices in a fleet of devices via one or more candidate discovery techniques and generating device-related data based on the candidate devices that are found; analyzing the device-related data via an analytics engine and creating one or more fleet orchestrator device lists based on the analysis of the device-related data; and automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

In accordance with yet another aspect of the exemplary embodiment, a non-transitory computer readable medium operable to perform a set of instructions, wherein when said instructions are executed on a computer, cause the computer to perform a method of automatically creating trust communities in a fleet of devices, is provided. The method includes finding candidate devices in a fleet of devices via one or more candidate discovery techniques and generating device-related data based on the candidate devices that are found, analyzing the device-related data via an analytics engine and creating one or more fleet orchestrator device lists based on the analysis of the device-related data, and automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

Optionally, and in accordance with any of the above aspects of the exemplary embodiment, finding candidate devices in a fleet of devices and generating data based on the candidate devices that are found includes sending out a network connectivity base communication query message on a local segment advertising an available service out to a network, wherein other devices learn about an available service via service discovery and at least one new device responds to query message looking for the available service.

Optionally, and in accordance with any of the above aspects of the exemplary embodiment, the query message is a multicast Domain Name System (mDNS) query message.

Optionally, and in accordance with any of the above aspects of the exemplary embodiment, finding candidate devices in a fleet of devices and generating data based on the candidate devices that are found includes a publisher device sending out a proximity based wireless communication message to find local devices, the local devices listening for proximity based wireless communication message, the local devices contacting the publisher device via a query to determine whether it is a multi-function device, determining whether the beaconing device is a publisher or a subscriber device, each device adding newly learned information to a respective fleet orchestrator device list, and the publisher or the subscriber device determining or suggesting a position in a trusted community for the devices.

Optionally, and in accordance with any of the above aspects of the exemplary embodiment, the one or more fleet orchestrator device lists include one or more of information to identify the devices, information to contact the devices, and information to automatically add and/or organize the devices into at least one trusted community.

Optionally, and in accordance with any of the above aspects of the exemplary embodiment, the device-related data comprises clone files and backup files, configuration reports, device address books, device users lists, and/or external inventory lists.

Optionally, and in accordance with any of the above aspects of the exemplary embodiment, the method further includes creating or downloading one or more files via the root device and sharing the one or more files with other devices in the at least one organized trust community via the root device.

Optionally, and in accordance with any of the above aspects of the exemplary embodiment, the fleet of devices includes one or more of printers, copiers, scanners, multi-function devices (MFDs), and multifunction printers (MFPs).

BRIEF DESCRIPTION OF THE DRAWINGS

FIG. 6 illustrates a sample inventory list; and

DETAILED DESCRIPTION

The exemplary embodiment described herein automates the tasks of identifying, finding, and validating managed devices, as well as building and arranging trust communities. By automating and simplifying the creation process, system administrators and other users are more likely to employ trust communities for file distribution, and, in addition, they are more likely to employ larger trust communities than if they had to add the devices individually.

Aspects of the exemplary embodiment relate to a system and method for managing a fleet of devices, such as multi-function devices (MFDs) and multi-function printers (MFPs), which facilitates the distribution of files across the fleet of devices and the performance of other group actions.

A file sharing function may be utilized to set up and maintain a fleet of devices. With this function, one device can be set up to share files automatically, so that all the devices are set up the same way without further intervention. This file sharing function allows device files to be shared across all devices. The files that can be shared include, but are not limited to, software update files, encrypted configuration files, workflow templates add-on files, user-content files, and the like.

The process of creating trust communities and setting up file distribution can be tedious and error prone, especially when adding many devices to the trust community. For example, to add a device, the system administrator typically needs to identify, find, and validate all the devices they wish to connect. Once found, these devices must be manually entered into the trust community. The network topology, i.e., the arrangement of the elements (links, nodes, etc.) of the communication network, and the file/content distribution topology are not usually the same. This makes it difficult to distribute content to the desired devices.

In this regard the exemplary embodiment may be employed to automatically connect a fleet of devices in a trust community quickly and efficiently for file distribution and other tasks. The exemplary embodiment will be discussed later in greater detail.

Figure 1:
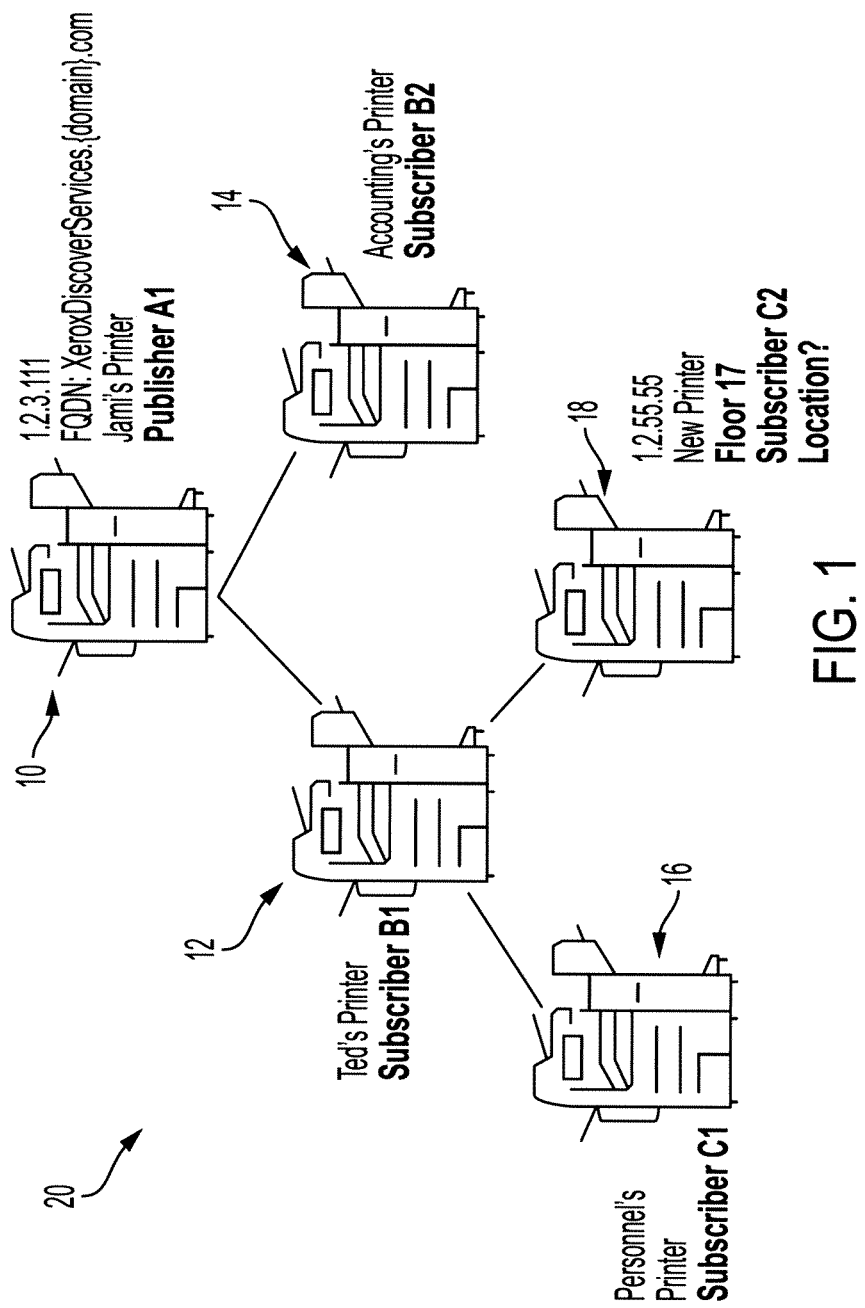
FIG. 1 illustrates an exemplary trust community in accordance with an aspect of the exemplary embodiment.

Initially, the basic system architecture of the exemplary embodiment will be discussed. In this regard, FIG. 1 illustrates an exemplary fleet of devices 10, 12, 14, 16, and 18 that may form at least one trust community 20. While only five devices and one trust community are illustrated in FIG. 1, it is to be appreciated that there may be any number of devices in the fleet and any number of trust communities formed. The exemplary devices 10, 12, 14, 16, and 18 are generally image forming devices, such as multi-function devices (MFDs) or multi-function printers (MFPs), which are configured to perform printing as well as other functions, such as printing, copying, scanning, and/or faxing, as well as stand-alone printers, copiers, scanners, and the like. As used herein, the terms MFD and MFP may be considered interchangeable. A fleet of such devices may be distributed across an organization, in different physical locations and/or used by people in different departments and/or having different job functions/device requirements. The exemplary embodiment described herein allows for targeted software updates and file distributions, among other things. The process of automatically creating a trust community, such as the trust community 20 shown in FIG. 1, will be discussed later (see FIGS. 2-5 and accompanying description).

As shown by way of example in FIG. 1, the device name attribute can be a unique identifier, such as an alphanumeric identifier or a more complex naming scheme may be employed, such as "Jami's Printer," "Accounting's Printer," "Guest printer 1," or a mix of IP addresses, HostNames, and fully qualified domain names (FQDNs), and so forth. The device name may be unrelated to the role of the device. The device user function is used for indicating the general function of the users of the device. For example, some of the devices may be used by people in the accounting department, while others are used by the personnel department or IT department. A location field can be used to identify respective locations of the devices.

The devices 10, 12, 14, 16, 18, etc. may be set up in any type of organizational structure, such as a tree structure (or distribution tree), for file distribution. The tree structure is described in greater detail, for example, in U.S. Pat. No. 10,367,957, by Schleede, et al., the disclosures of which are incorporated herein by reference. However, more general distribution approaches are equally possible. For example, approaches such as self-organizing distribution topologies and associated mechanisms, or a graph vs. tree topology, may be considered.

Figure 2:
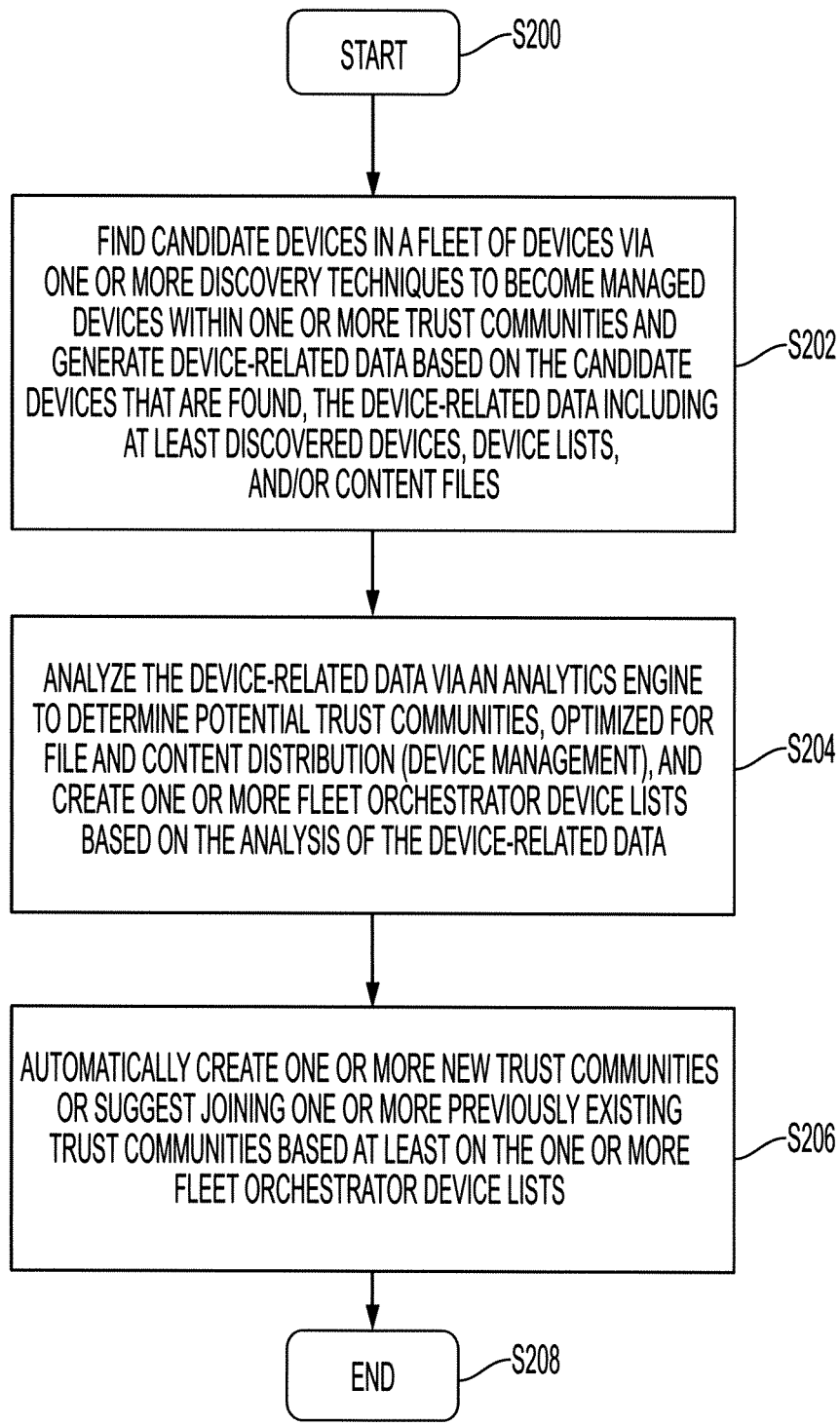
FIG. 2 illustrates an exemplary method of automatically creating trust communities.

As noted earlier, the process of creating and organizing trust communities and setting up file distribution can be tedious and error prone, especially when adding many devices to a trust community. In this regard, FIG. 2 illustrates an exemplary method of automatically creating and organizing new trust communities, like the one (20) shown in FIG. 1, through an automated fleet orchestrator feature in the devices 10, 12, 14, 16, 18, etc. As used herein, the term "fleet orchestrator" refers to an implementation of a method to provide a native scalable management of a fleet of managed devices, as described, for example, in U.S. Pat. No. 10,367,957, by Schleede, et al., the disclosures of which are incorporated herein by reference.

With reference to FIG. 2, the exemplary method begins at S200 and includes the features of:

finding (or discovering) candidate devices in a fleet of devices via one or more discovery techniques to become managed devices within one or more trust communities and generating device-related data based on the candidate devices that are found, the device-related data including at least discovered devices, device lists, and/or content files (S202);

analyzing the device-related data via an analytics engine to determine potential trust communities, optimized for file and content distribution (device management), and creating one or more fleet orchestrator device lists based on the analysis of the device-related data (S204); and automatically creating one or more new trust communities or suggesting joining one or more previously existing trust communities based at least on the one or more fleet orchestrator device lists so that more devices can be managed without manually entering them (S206).

Regarding S202 of FIG. 2, it is to be understood that any number of devices in a fleet of devices, such as devices 10, 12, 14, 16, and 18, may be found via any number of device discovery mechanisms.

Figure 3:
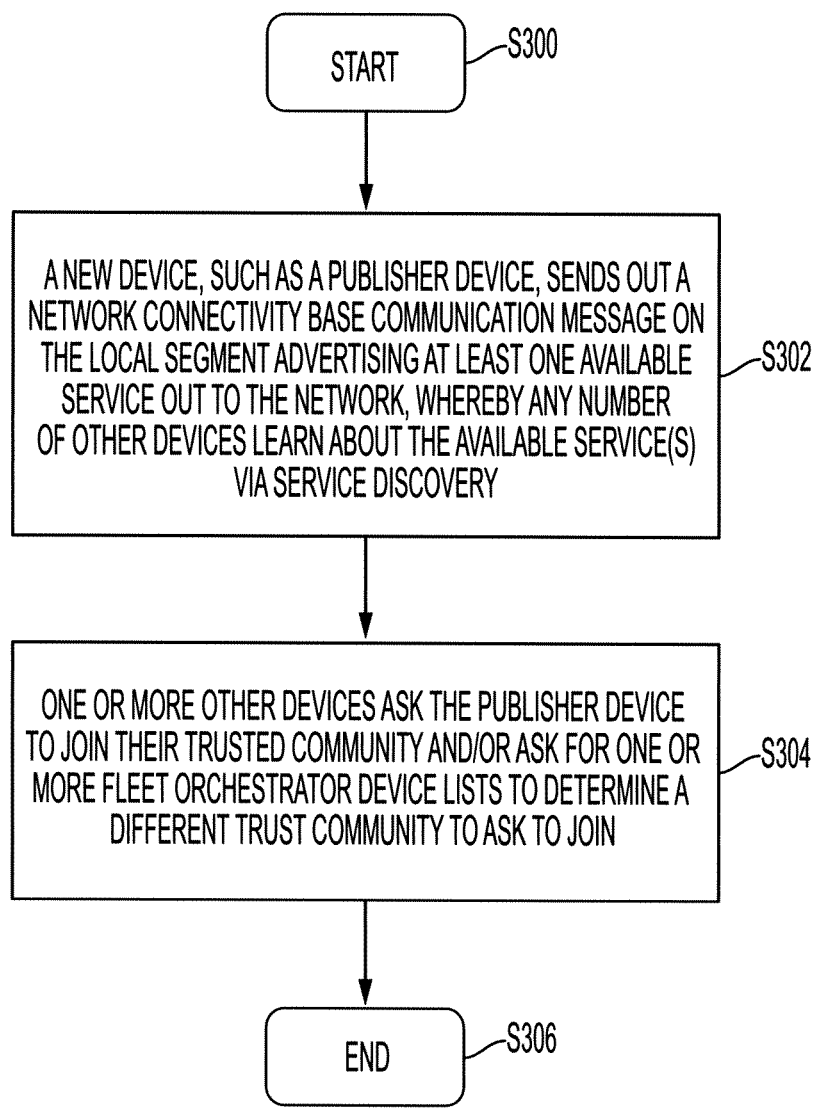
FIG. 3 illustrates an exemplary method of finding candidate devices.

By way of example, one such mechanism of finding (or discovering) candidate devices in the fleet of devices involves using a network connectivity base communication method, such as multicast DNS (mDNS), to advertise publisher as a new service to the local segment, as illustrated in FIG. 3.

As shown in FIG. 3, the device discovery method begins at S300. At S302, a new device, such as publisher device 10, sends out a network connectivity base communication message on the local segment advertising at least one available service, such as a fleet orchestrator publisher (or root device terminology) service, out to the network (DNS-SD), whereby any number of other devices (e.g., devices 12, 14, 16, 18) learn about the available service(s), such as the fleet orchestrator publisher service, via service discovery.

The message may comprise, for example, an mDNS query message, such as A-XeroxDiscoverServices.{domain}.com 1.2.3.111. In computer networking, the mDNS protocol resolves hostnames to IP addresses within small networks that do not include a local name server. It is a zero-configuration service, using essentially the same programming interfaces, packet formats and operating semantics as the unicast Domain Name System (DNS). Further, mDNS can work in conjunction with DNS Service Discovery (DNS-SD). Nonetheless, it is to be understood that the query message may be in a different format.

The new device (i.e., device 10) responds to any queries (e.g., mDNS queries) from other devices looking for this available service.

At S304, one or more other devices (e.g., devices 12, 14, 16, 18) ask the publisher device (i.e., device 10) to join their trusted community (e.g., trust community 20) and/or ask for one or more fleet orchestrator device lists to determine a different trust community to ask to join.

The method ends at S306.

Figure 4:
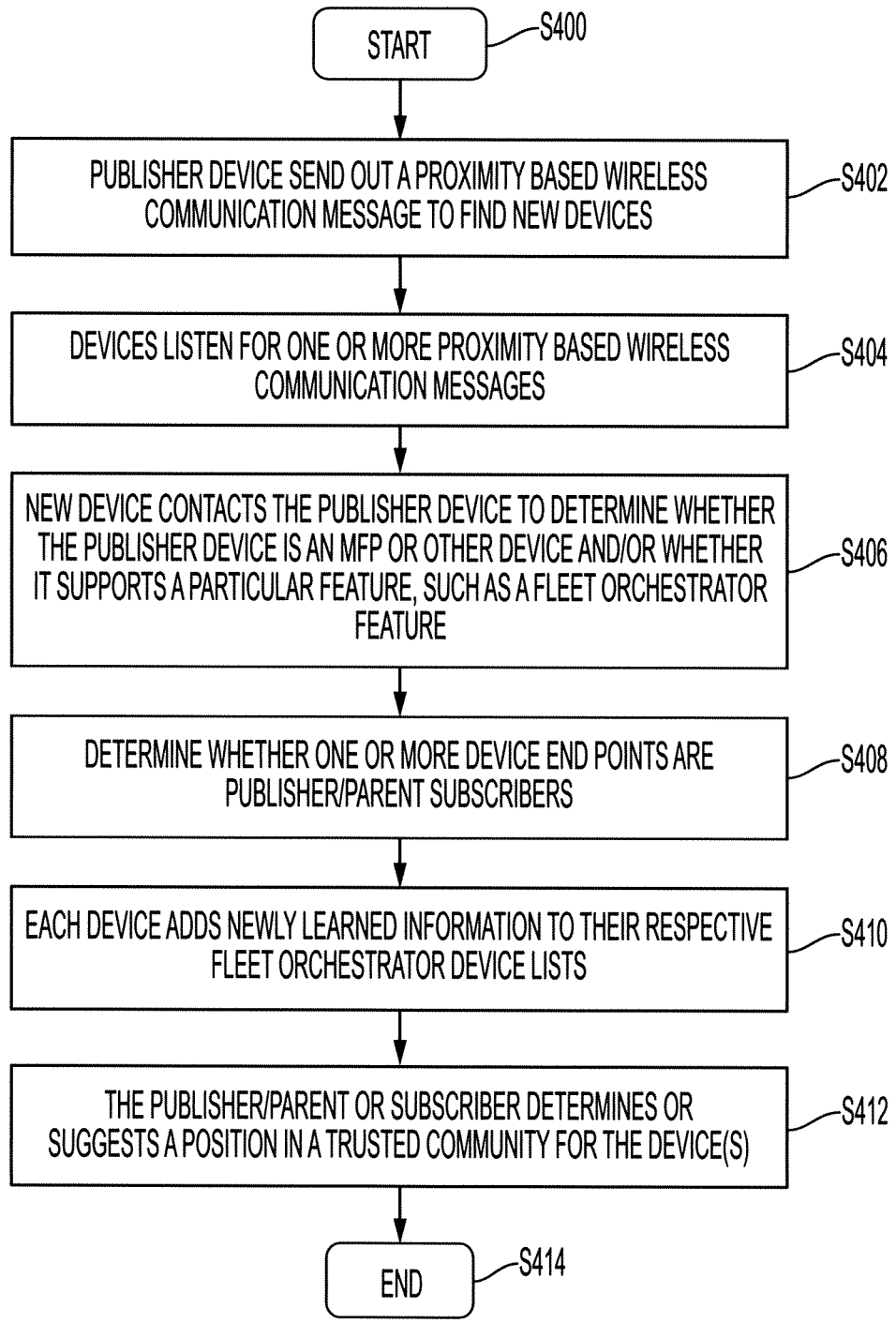
FIG. 4 illustrates an alternative method of finding candidate devices.

An alternative mechanism for finding candidate devices that may be used separately or in addition to the above mechanism involves using at least one proximity based wireless communication technique, including, but not limited to, Bluetooth, WiFi Direct, and/or Near Field Communication (NFC), etc., to share information relating to at least one of the devices, such as MFD IP address, as illustrated in FIG. 4.

As shown in FIG. 4, the alternative device discovery method begins at S400. At S402, a publisher device (e.g., device 10) sends out a proximity based wireless communication message, such as a Bluetooth beacon, to find any number of local devices (e.g., devices 12, 14, 16, 18) interested in at least one available service (e.g., a fleet orchestrator publisher service). In this example, assume that device 18 is a new MFP.

At S404, the new device 18 listens for one or more proximity based wireless communications, such as a Bluetooth beacon.

At S406, the new device 18 contacts the beaconing device 10 to determine whether the beaconing device 10 is an MFP and/or whether it supports a particular service, such as a fleet orchestrator service. A Simple Network Management Protocol (SNMP) query may be used in this case. But it is to be understood that other types of queries may be used.

At S408, a determination whether one or more device end points are publishers/parents or subscribers is made.

At S410, each device adds newly learned information to their respective fleet orchestrator device lists.

At S412, the publisher/parent or subscriber (i.e., device 10) determines or suggests a position in a trusted community for the respective candidate device(s) (e.g., device 18).

The method ends at S414.

Of course, it is to be understood that there are other various ways to find candidate devices, including, but not limited to, using one or more the following additional mechanisms:

Manual identification via Fully Qualified Domain Name (FQDN)/IP Address

Manual static DNS entry for: "XeroxDiscoverServices.domain.com"/DNS-SD Xerox Discovery Services. If there is a particular device that always has the same IP address and it would be preferable to refer to it by name—for example, to type its name into a browser's Address bar and reach the device—it is possible to create a static DNS entry for it. This will tell the DNS server 'if you see this DNS name, that means this IP address'.

Referrals around, i.e., share fleet orchestrator device list.

Wi-Fi Direct discovery. Wi-Fi Direct is a connection that allows for device-to-device communication, linking devices together without a nearby centralized network. One device generally acts as an access point, and the other device(s) may connect to it using, for example, WPS (Wi-Fi Protected Setup) and WPA/WPA2 (Wi-Fi Protected Access) security protocols.

Dynamic Host Configuration Protocol (DHCP). DHCP is a network management protocol used on UDP/IP networks whereby a DHCP server dynamically assigns an IP address and other network configuration parameters to each device on a network so they can communicate with other IP networks.

Scan configuration sheets, configuration sheets contain device specific information that can allow for a device to be identified.

Cisco Identity service option. (Can they be queried for other related devices?) The Cisco Identity Services Engine (ISE) offers a network-based approach for adaptable, trusted access everywhere, based on context.

Apps—custom apps to assist with discovery.

Cloud/remote services

Importing Inventory list (spreadsheet)

Returning now to the method shown in FIG. 2, at S204, various types of data from or about the discovered devices is then analyzed via, for example, an analytics engine, and devices are added to one or more device lists. In this regard, an exemplary device list may contain various pieces of information/data, including, but not limited to: (a) information to identity the devices, such as host name, model, speed, etc., (b) information for contacting the devices, such as IP addresses, fully qualified domain names (FQDN), etc., and/or (c) information to potentially auto-sort the devices into at least one trusted community, among other things. This latter information may include, for example, major software version, location, network information (e.g., wired vs. wireless), subnet, related information such as publisher status, parent subscriber status, trust community information, and/or extracted clone file data, among other things.

With the fleet orchestrator feature enabled, each MFP may typically keep a log of other MFPs they learn about via any of the various device finding mechanisms along with some key fleet-related information. This key fleet-related information (or a subset of this information) can be optionally shared with other fleet-related device list enabled MFPs. This key fleet-related information can then be used by publishers/parent subscribers to auto-generate and/or auto-suggest trusted communities.

Figure 5:
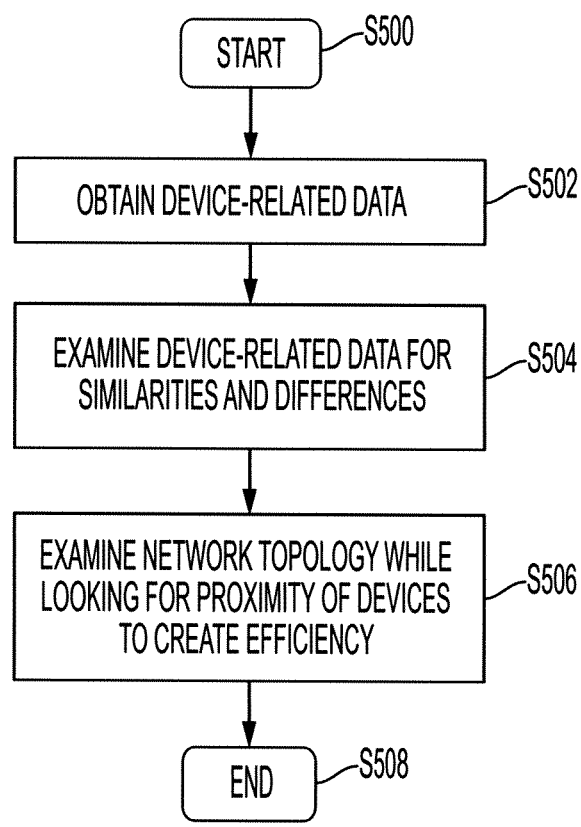
FIG. 5 illustrates an exemplary method of analyzing device-related data to create or suggest trust communities.

The analysis of the discovered devices can be performed in various ways, depending upon the desired results. FIG. 5 illustrates an exemplary method of analyzing device-related data, which may be performed by an analytics engine.

As shown in FIG. 5, the method of analyzing device-related data begins at S500. At S502, the device-related data is obtained. There are various types of data that may be available for analysis. For instance, clone files and backup files contain thousands of attributes and other information that can be examined and compared. A configuration report (e.g., in eXtensible Markup Language (XML) format) could be extracted from the discovered devices. Programmatic calls to the discovered devices can also extract thousands of pieces of information about the devices. The device address book (e.g., in comma-separated values (CSV) format) could be extracted. A list of users of the MFD (i.e., user database) could be extracted. An external (i.e., customer created) inventory list can be used to compare devices based on external data such as budget center. This can be as extensive as the inventory list. A sample inventory list is shown in FIG. 6. Network topology information could also be extracted.

At S504, the device-related data obtained is then examined for similarities, among other things. There are many different types of information that might be useful for grouping devices into trust communities.

For instance, by looking at the entries of the Address Book, it is possible to find devices with similar or identical address book entries. Creating trust communities for devices with the same address could be helpful with distributing the Address Book to a fleet of devices.

It is possible to examine the user database (i.e., list of users of the system) of the discovered devices for similarities and create trust communities for those with similar or identical list of users.

Another approach is to compare the entire clone or backup file among the discovered devices and create a trust community for similar devices. The clone or backup file represent the setup of the device. Those devices with similar setup or configuration values (e.g., email server, authentication server, accounting setup, etc.) could be managed similarly.

The software version or device model number from the configuration report or other sources listed above may be checked. One or more trust communities may be created for those devices that are the same model or have the same software version. This would be a valuable tool for distributing software to keep all devices up to date.

The system administrator's name or device location may be checked from many of the sources of data, including an inventory list (e.g., a spreadsheet). Creating a trust community for those similar devices might help the main administrator manage their devices effortlessly.

The language of the device(s) or other geographic settings, such as time zone, may be checked. A trust community for those devices that are in proximity may be created.

Examining the data for connectivity settings could potentially create two trust communities for wireless devices and wired devices such that they more easily manage any changes to the connectivity settings.

Looking at the device email alerts and finding devices that share the same email alerts email address may be helpful, based on the assumption they are the device administrator for all those devices.

It is also possible to look at the hostname for similarities (Kensdevice1, Kensdevice2, Kensdevice3 and Jeansdevice). The MFD might suggest a trust community for Ken's devices (i.e., Kensdevice1, Kensdevice2, Kensdevice3).

It may be useful to look at historical information from clone installations to find trends. For example, this approach may uncover the same source of a clone file, or other devices that always get the same clone file.

Any one or more of the approaches noted above may be utilized to examine for similarities.

It is also noted that the device-related data may be examined for differences as well. In this regard, the following approaches might also be useful for grouping devices into trust communities.

For example, it may be helpful to check the software version, while looking for devices that are not at the approved software version. One or more trust communities may be created for those devices to ensure all device software is kept up to date.

Also, it may be helpful to compare the entire clone or backup file among the discovered devices and create a trust community for devices whose configuration does not match the approved settings (e.g., settings found on one device). In that case, the system administrator or other user can effortlessly keep these devices within the approved configuration.

At S506, the network topology is then examined, while looking for proximity of devices to create efficiency. For example, it may be beneficial to minimize router hops between devices. Also, look for bandwidth information to optimize the network traffic. There are various ways to analyze the data, but the examples listed above utilize existing infrastructure and/or files.

The method ends at S508.

Returning now to FIG. 2, at S206, the data that has been obtained and analyzed is used to automatically create and/or suggest trusted communities for new MFPs in the fleet orchestrator device list. That is, it is now possible to automatically suggest previously existing trust communities and/or automatically configure a new trust community based on the fleet orchestrator device list information. A subset of data in the fleet orchestrator device list is shared with other fleet orchestrator devices.

When a publisher device (such as device 10) learns about a new MFP (such as device 18) in the fleet orchestrator device list that is not part of a trusted community (such as trusted community 20), then it is possible to look at the device data, which includes product family/model, major software version, physical location, and/or IP/subnet info (i.e., is it on the same subnet?), among other things. The sort order of this information may be configured automatically or by the system administrator.

Based on existing trust community knowledge and fleet orchestrator device list data, trusted community locations are automatically suggested or determined.

It may be helpful to act on the publisher (e.g., device 10) and/or the new device (e.g., device 18) to automatically add or generate a request for the new device to get added to the recommended trusted community (or communities).

Based on the analysis of several discovered devices, the MFP could auto generate tree configurations. For example, a tree of all MFPs that share a given software version (i.e., can be upgraded with the same software file) can be created. Or the MFP could determine the originator of clone file create a tree with the originator as root. For example, a tree of all MFPs that have installed a clone file from the same originator, where the originator is the root, can be created. Further, the MFP could find similar MFPs to recommend existing trees that it could join. For example, an existing tree of similar MFPs exists that it could be a part of. Suggests to system administrator that they could join that tree.

Based on actions performed, the MFP could use data in a clone file to determine what MFP is the originator, and query known MFPs for matching originator. For example, the MFP could send a message such as "Hello system administrator, I noticed that you're manually installing clone files from that MFP. We could do that for you." Alternatively, the message could be, for example: "The device has detected that you are manually installing clone files from a specific MFP. Would you like the device to create a connection to that other device to allow for future clone files to be installed automatically?" The MFP may query known MFP's for matching software versions after its software has been upgraded. For example, the MFP could send a message such as "Hello system administrator, I noticed that you're manually upgrading all these devices to the same software versions. We could do that for you." It is to be understood that these are just examples of the types of messages that could be sent and that other types of messages could be utilized in accordance with aspects of the exemplary embodiment.

As shown in FIG. 2, the method ends at S208.

Although only one trust community (i.e., trust community 20) is shown in FIG. 1, it is to be understood that any number of trust communities may be created. That is, it is possible to create overlapping trust communities via this method. For example, at least one device (e.g., device 10) may be located in a trust community (e.g., trust community 20) to keep its software version up to date. And this device (e.g., device 10) may also be located in another trust community (not shown) of devices that are all managed by one system administrator. Further this device (e.g., device 10) may be located in yet another trust community (not shown) that shares print-ready files and so on.

It is to be understood that the analytics provided by the exemplary embodiment can drive (1) fully automatic operation and creation of trust communities (e.g., great for small companies with minimal expertise and IT staff), (2) assisted setup, for example, by generating scenarios for a system administrator to consider, and/or (3) deep analytics for informing the system administrator so that they could set up the trust communities with minimal assistance. Analytics using AI/machine learning can really explain patterns in data.

Typically, at least one of the managed devices (e.g., device 10) in the newly created and organized trust community (or communities) (e.g., trust community 20) is configured as a root device to publish files via a file sharing function. Thus, one or more files may be created or downloaded via the root device, and the one or more files may be shared with other devices in the organized trust community via the root device.

The exemplary embodiment thus includes capabilities and conventions that empower an enterprise to quickly characterize and profile their IT ecosystem, device-related content, and distribution mechanisms and structure.

New software tools allow system administrators to quickly understand and profile their IT infrastructure topology in various ways. In this regard, information is captured in a schema/database. For example, information regarding devices, such as country, state, campus, building, subnet, etc. may be identified via a query. Content such as software release is associated with both content repositories and devices that use content (for example, "show me devices running v1.1"). A focus here is to create and organize (assisted or automatically) trusted communities of devices based on analyses of device information and content.

The infrastructure topology can be analyzed in ways that will help to create/enumerate candidate distribution topologies (graph or tree structure of connected devices). This exemplary embodiment highlights the distinction between infrastructure versus distribution topologies. The toolset serves as an enabler for advanced data mining, infrastructure profiling, fleet content profiling, and distribution topology selections. A content delivery playlist can be generated based on current state, desired state, impacted devices and distribution topology. Analytics will help in assessing/determining optimal distribution connectivity and content routing. For example, if content is "light," perhaps peer-peer connectivity suffices. If the content payload is significant, and/or distribution topology is large, perhaps a tree organization makes sense. Analytics can inform the fleet system administrator as to optimal configurations.

Running these tools can be interactive/assisted, semi-automatic, or automatic depending upon technical expertise availability and desire for optimal fine-grained control, versus a smaller company with limited system administrator support that just wants it to work, if less optimally.

A further goal is to automatically build the infrastructure topology. To do this requires a more precise definition of related information (i.e., campus location, building, subnet, etc.) While it is common today to detect devices on a network, via more controlled information the IT topology can be automatically generated or inferred (difference between relational vs "no sql" or graph databases). For example, whereas one system administrator may textually specify that a device is in Bldg293, 2nd floor, another may enter the location as B293-FI2. This type of discrepancy creates "dirty data," which causes problems for self-describing or analyzing related infrastructure data. A stricter user interface (UI) input that validates format via rules or programmatic choice ensures a discovery format that can be processed to derive IT topology automatically. Another aspect of the exemplary embodiment is that devices learn from nearby neighbors, so obtaining parse-able, consistent device information in a format needed for automated topology generation is improved considerably.

Finally, another aspect involves writing the content delivery playlist directly into a controlling "root" distribution device. The fleet orchestrator feature may include an embedded SQL database (PostgreSQL), for example. The database has been opened, and the content distribution topology may be written directly and automatically into the root device. A major challenge is that it is time consuming to manually create a distribution tree (graph using adjacency lists for connectivity). With this new approach, trees (graphs/topologies) can be "set up" and "torn down" very quickly. The current tree may be read into tools that can do further (visual) modeling and structure refinement/optimization, and then the new distribution connectivity can be written. Analytics can help to drive scenario generation, so a system administrator can quickly evaluate a series of plausible topologies with information as part of being guided towards the best distribution setup.

The exemplary embodiment offers a clear distinction between an IT infrastructure versus a distribution topology, which facilitates analyses used in creating a distribution platform with the correct content.

The exemplary embodiment also involves deep subject/device content. Beyond simple measures such as software release, systems can include and manage more data. For example, internally there are thousands of data items on a device. Key attributes can be exposed and migrated to an analytics platform for more insights into optimal management/configuration. Many of the internal formats are proprietary and inconsistent. A normalized external format (e.g., XML, XML schema) facilitates further analytics.

Yet another aspect of the exemplary embodiment includes assisted and automated/unassisted insights and configurations based on improved data management, analytics, and computational graph capability. Candidate content distribution models can be enumerated quickly. A fleet administrator (FA) can have confidence in their choices.

The fleet orchestrator feature has a standalone/built-in distribution infrastructure. But any delivery mechanism could be used. For example, the infrastructure and analytics components could be used to drive delivery over the software update system (or others) via connectors. What and where can be determined independently and how content is to be delivered may be loosely coupled from these other related activities. Of course, multiple delivery mechanisms may be concurrently active with proper design.

Figure 7:
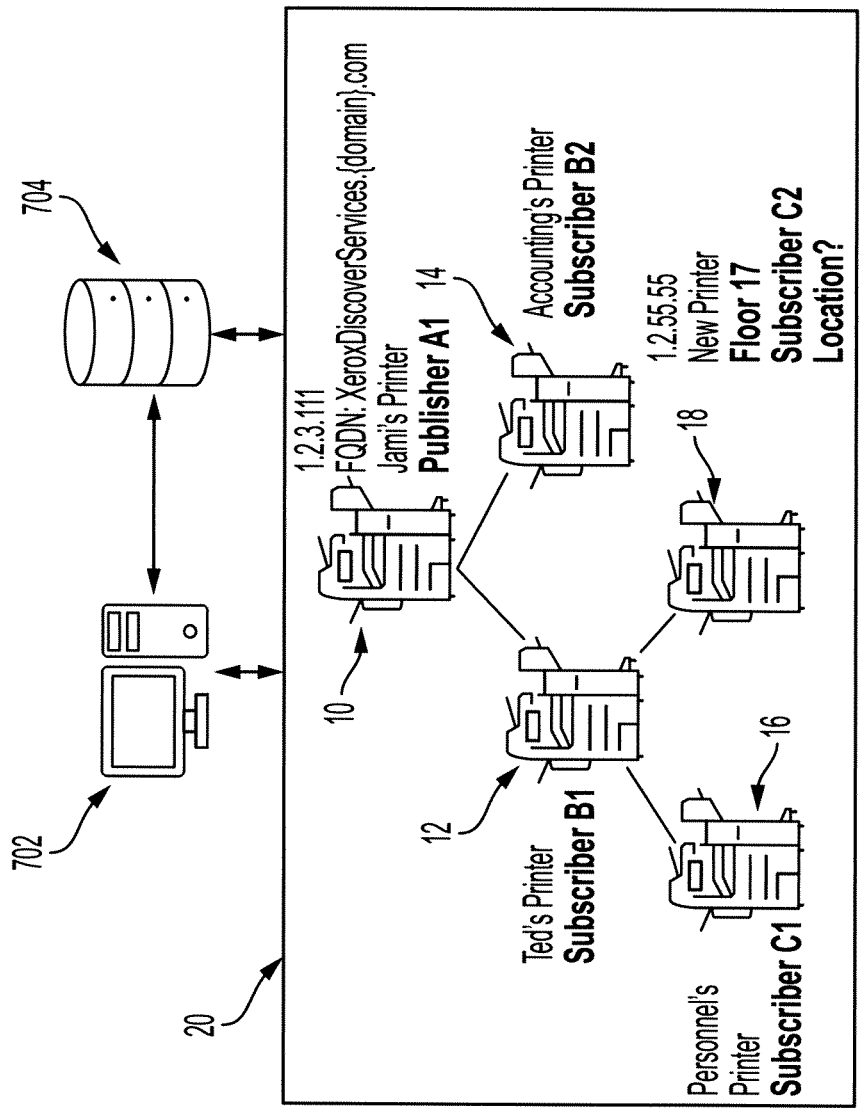
FIG. 7 is a functional block diagram of an exemplary system incorporating the trust community of FIG. 1 in accordance with an aspect of the exemplary embodiment.

With reference now to FIG. 7, an exemplary network enterprise fleet management system 700 incorporating at least one trust community, such as the trust community 20 of FIG. 1, is shown. The system 700 may include an optional network controller 702 for managing the distribution of data from a database 704 to any number of devices, such as the devices 10, 12, 14, 16, 18, etc., shown in FIG. 1, among other entities. Any of the methods described herein, including the methods illustrated in FIGS. 2-5, may be implemented in the network controller 702, in any of the devices 10, 12, 14, 16, 18, etc., or in any other suitably configured computing devices.

The data stored in the database 704 may include, but is not limited to, updates to the devices in the form of one or more files, such as configuration files, and may be distributed via wired or wireless links, such as a local area network, wide area network, or the like. In the case of image forming devices, the distributed files may include, for example, updates to device security settings and/or settings related to the performance of printing, scanning, copying, and the like. It should be noted that the connectivity between devices uses web services protocols and while the preferred embodiment has been described with respect to LAN (if connecting across the globe), the exemplary embodiment is equally suitable over the cloud. It could, for example, integrate with (layer over) a cloud pub-sub service or storage mechanism.

With continued reference to FIG. 7, the network controller 702 and any of the devices 10, 12, 14, 16, 18, etc. may be in communication with the database 704, which stores information about the devices 10, 12, 14, 16, 18, etc. and information (such as device lists) related to the analysis to be performed, in the form of one or more database tables (not shown). The database 704 may include various other types of information, such as distribution profiles and attributes for a particular device or other entity and relationships between pairs of devices. The device relationships may be selected based on available network connections, network connection costs, network speed, device locations, download schedules and/or other user-selected criteria.

Devices 10, 12, 14, 16, 18, etc. may be mentioned in a database table wherein each device has a set of attributes listed in fields of the table or otherwise stored in memory, such as in a separate linked table, which may be used to profile the fleet. Each attribute in a field is selected from a set of attributes. The fields may include some or all of device name, device model, device user function, location, and Update Schedule. The device name attribute is generally a unique identifier, such as an alphanumeric identifier or a more complex naming scheme may be employed, such as "Guest printer 1," "Admin printer," or a mix of IP addresses, HostNames and fully-qualified domain names (FQDNs), and so forth. The device user function is used for indicating the general function of the users of the device. For example, some of the devices may be used by people in the Quality Assurance (QA) department, while others are used by the Development (Dev) department or IT department. A location field can be used to identify respective locations of the devices.

As shown in FIG. 7, the network controller 702 has access to the database 704 and/or to information extracted therefrom, such as the trust community 20 and distribution profiles. Although not shown, it is to be understood that the computer-implemented network controller 702 includes memory, which stores instructions for performing the methods described herein and a processor, in communication with the memory, for executing the instructions. The network controller 702 includes one or more input/output (I/O) devices for communicating with external devices. While a single network controller 702 is shown, there may be two or more file network controllers 702 on the same server, or on separate servers. Each network controller may control file distribution to a respective set of managed devices. This may be supported via secure application programming interfaces (APIs).

Hardware components of the network controller are communicatively connected by a data/control bus. A display device allows a human user to view information generated by the database 704, such as the fleet orchestrator device lists. The display device may be a computer monitor of a client device, in communication with the network controller. A user input device, such as a keyboard, keypad, touch screen, computer mouse, combination thereof, or the like, allows a user to input data and commands to the processor. A storage element may store various types of information relating to the devices to help save information to perform the analysis, including, but not limited to, clone files, device lists, upgrade files.

Further, it is to be understood that each of the managed devices 10, 12, 14, 16, 18, etc. includes a respective device controller (not shown). The typical device controller includes memory, which may store the policy, and instructions, which are implemented by an associated processor. A configuration file may be received from the respective parent device by an input device and stored in memory. An output device transmits the file, such as a configuration file, to the children of the device, if there are any. The software instructions may include a configuration file implementation component, for implementing the configuration file on the respective device in accordance with a policy, a file publishing component, for sending the configuration file to the children of the managed device, in accordance with an update schedule and/or when a request for download is received from the child devices, and a print manager for controlling printing of received print jobs on an associated marking engine. In the case of an MFD/MFP, the configuration file may thus include updates to printer settings, security and so forth.

The managed devices 10, 12, 14, 16, 18, etc. may receive print jobs from a source device, such as a user's computing device, network server, scanner, USB device, smartphone, or the like. Each print job may include one or more images, such as text, graphics, photographs, or the like, to be printed. The print manager may be instructed by the configuration file implementation component to control the printing in accordance with the configuration file, as modified by the policy for that device. The print manager therefore controls the execution of the print jobs by the marking engine accordingly. The marking engine includes hardware elements for rendering the digital print job images on a print media substrate, such as paper, using a marking material or materials, such as colored inks or toners and for outputting the printed sheets.

The computer-implemented system 700 may include thus include one or more computing devices 702, each of which may be a PC, such as a desktop, a laptop, palmtop computer, portable digital assistant (PDA), server computer, microprocessor, cellular telephone, tablet computer, pager, combination thereof, or other computing device capable of executing instructions for performing the exemplary method.

The memory of the illustrated computing device(s) 702 may include any type of non-transitory computer readable medium such as random-access memory (RAM), read only memory (ROM), magnetic disk or tape, optical disk, flash memory, or holographic memory. The input/output interfaces may comprise a modulator/demodulator (MODEM) a router, a cable, and and/or Ethernet port. The digital processors of the computing device(s) 702 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The methods described herein and illustrated in FIGS. 2-5 may be at least partially implemented in a computer program product or products that may be executed on a computer or computers. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computers, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing a part of the flowcharts shown in FIGS. 2-5, can be used to implement the methods. As will be appreciated, while the steps of the methods may all be computer implemented, in some embodiments one or more of the steps may be at least partially performed manually.

As will be appreciated, the steps of the methods need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of automatically creating trust communities in a fleet of devices, the method comprising:
   finding candidate devices in a fleet of devices via one or more candidate discovery techniques and generating device-related data based on the candidate devices that are found;
   analyzing the device-related data via an analytics engine and creating one or more fleet orchestrator device lists based on the analysis of the device-related data; and automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

2. The method of claim 1, wherein finding candidate devices in a fleet of devices and generating data based on the candidate devices that are found comprises:
sending out a network connectivity base communication query message on a local segment advertising an available service out to a network, wherein other devices learn about an available service via service discovery;
at least one new device responds to query message looking for the available service.

3. The method of claim 2, wherein the query message comprises a multicast Domain Name System (mDNS) query message.

4. The method of claim 1, wherein finding candidate devices in a fleet of devices and generating data based on the candidate devices that are found comprises:
a publisher device sending out a proximity based wireless communication message to find local devices;
the local devices listening for proximity based wireless communication message;
the local devices contacting the publisher device via a query to determine whether it is a multi-function device;
determining whether the beaconing device is a publisher or a subscriber device;
each device adding newly learned information to a respective fleet orchestrator device list;
the publisher or the subscriber device determining or suggesting a position in a trusted community for the devices.

5. The method of claim 1, wherein the one or more fleet orchestrator device lists include one or more of information to identify the devices, information to contact the devices, and information to automatically add and/or organize the devices into at least one trusted community.

6. The method of claim 1, wherein the device-related data comprises clone files and backup files, configuration reports, device address books, device users lists, and/or external inventory lists.

7. The method of claim 1, further comprising:
creating or downloading one or more files via the root device; and
sharing the one or more files with other devices in the at least one organized trust community via the root device.

8. The method of claim 1, wherein the fleet of devices comprises one or more of printers, copiers, scanners, multifunction devices (MFDs), and multifunction printers (MFPs).

9. A system for automatically creating trust communities in a fleet of devices, the system comprising:
at least one processor; and
at least one memory including computer program code;
the at least one memory and the computer program code configured to, with the at least one processor, cause the system at least to perform:
finding candidate devices in a fleet of devices via one or more candidate discovery techniques and generating device-related data based on the candidate devices that are found;
analyzing the device-related data via an analytics engine and creating one or more fleet orchestrator device lists based on the analysis of the device-related data; and
automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

10. The system of claim 9, wherein finding candidate devices in a fleet of devices and generating data based on the candidate devices that are found comprises:
sending out a network connectivity base communication query message on a local segment advertising an available service out to a network, wherein other devices learn about an available service via service discovery;
at least one new device responds to query message looking for the available service.

11. The system of claim 10, wherein the query message comprises a multicast Domain Name System (mDNS) query message.

12. The system of claim 9, wherein finding candidate devices in a fleet of devices and generating data based on the candidate devices that are found comprises:
a publisher device sending out a proximity based wireless communication message to find local devices;
the local devices listening for proximity based wireless communication message;
the local devices contacting the publisher device via a query to determine whether it is a multi-function device;
determining whether the beaconing device is a publisher or a subscriber device;
each device adding newly learned information to a respective fleet orchestrator device list;
the publisher or the subscriber device determining or suggesting a position in a trusted community for the devices.

13. The system of claim 9, wherein the one or more fleet orchestrator device lists include one or more of information to identify the devices, information to contact the devices, and information to automatically add and/or organize the devices into at least one trusted community.

14. The system of claim 9, wherein the device-related data comprises clone files and backup files, configuration reports, device address books, device users lists, and/or external inventory lists.

15. The system of claim 9, wherein the at least one memory and the computer program code are configured to, with the at least one processor, cause the system at least to perform:
creating or downloading one or more files via the root device; and
sharing the one or more files with other devices in the at least one organized trust community via the root device.

16. The system of claim 9, wherein the fleet of devices comprises one or more of printers, copiers, scanners, multifunction devices (MFDs), and multifunction printers (MFPs).

17. A non-transitory computer readable medium operable to perform a set of instructions, wherein when said instructions are executed on a computer, cause the computer to perform a method of providing management of a fleet of managed devices, the method comprising:
- finding candidate devices in a fleet of devices via one or more candidate discovery techniques and generating device-related data based on the candidate devices that are found;
- analyzing the device-related data via an analytics engine and creating one or more fleet orchestrator device lists based on the analysis of the device-related data; and
- automatically creating one or more new trust communities or suggesting joining one or more previously existing trust communities based at least on the one or more fleet orchestrator device lists for the candidate devices, wherein the one or more new trust communities or previously existing trust communities include at least a sub-set of the devices in the fleet, and wherein at least one of the managed devices in the sub-set of devices is configured as a root device to publish files via a file sharing function.

18. The non-transitory computer readable medium of claim 17, wherein the one or more fleet orchestrator device lists include information to identity the devices, information to contact the devices, and/or information to auto sort the devices into at least one trusted community, and wherein the device-related data comprises clone files and backup files, configuration reports, device address books, device users lists, and/or external inventory lists.

19. The non-transitory computer readable medium of claim 17, wherein the device-related data comprises clone files and backup files, configuration reports, device address books, device users lists, and/or external inventory lists.

20. The non-transitory computer readable medium of claim 17, wherein the fleet of devices comprises one or more of printers, copiers, scanners, multifunction devices (MFDs), and multifunction printers (MFPs).

* * * * *